J. W. WALTER.
DEVICE FOR PULLING AUTOMOBILES OUT OF MUDHOLES.
APPLICATION FILED JUNE 7, 1919.

1,324,706.

Patented Dec. 9, 1919.

Inventor
J. W. Walter

By Franklin H. Hough
Attorney

UNITED STATES PATENT OFFICE.

JOHN WILLIAM WALTER, OF KINGMAN, KANSAS.

DEVICE FOR PULLING AUTOMOBILES OUT OF MUDHOLES.

1,324,706.  Specification of Letters Patent.  Patented Dec. 9, 1919.

Application filed June 7, 1919. Serial No. 302,532.

*To all whom it may concern:*

Be it known that I, JOHN W. WALTER, a citizen of the United States, residing at Kingman, in the county of Kingman and State of Kansas, have invented certain new and useful Improvements in Devices for Pulling Automobiles Out of Mudholes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for pulling automobiles out of mud holes, etc., and consists of a simple device of this nature comprising a track made up of slats movably mounted upon cables or ropes which are provided with hooks for attachment to the rear driving wheel of an auto, and other fastening means for passing about the circumference of the forward wheels and forming means whereby, when the rear wheels are driven, a pull is imparted to the forward wheels through the connections, thus affording maximum power to extricate the machine.

I illustrate my invention in the accompanying drawings which, with the letters of reference marked thereon, form a part of this application, and in which.

Figure 1:
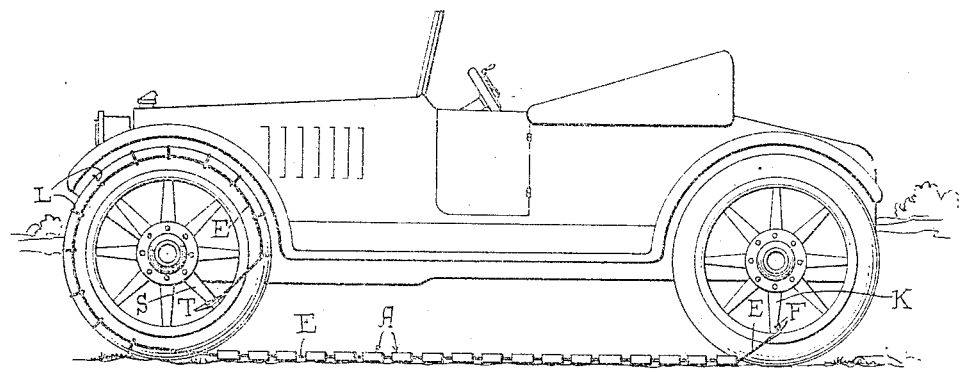
Figure 1 is a view showing the application of my invention to an automobile.
Figure 2:
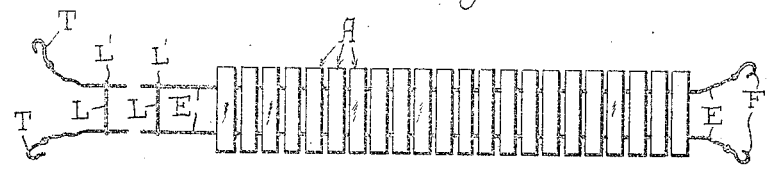
Fig. 2 is a detail view of the device removed from the car.
Figure 3:
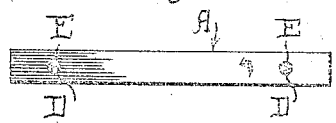
Figs. 3 to 5 are detail views.
Figure 4:
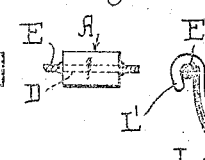
Figure 5:
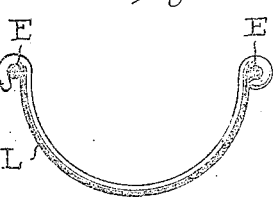

Reference now being had to the details of the drawings by letter:

A, A designate a series of slats preferably of wood and which are of sufficient length to form a track for a tire, and each of said slats has transverse apertures D for the reception of the ropes E, which latter have hooks F at one end adapted to engage over the rear spokes K of the driving wheel of an automobile upon either side of the tire. Said ropes have U-shaped members L with eyes L' at their ends through which the ropes pass, and which members are adapted to engage over the tread surface of the forward tire extending nearly around the circumference thereof, and hooks T are fastened at the forward ends of the ropes and are adapted to engage over the spokes S of the front wheel in the manner shown.

When the device is applied to an automobile and it is desired to start the latter, the power imparted to the rear wheel will cause a pull upon the ropes, the rear wheels riding upon the blocks forming a track, while a rearward pull is imparted to the ropes and to the forward wheels. Each side of the automobile being similarly equipped with a device of this nature it will afford means whereby a maximum power of the engine will be imparted to all four wheels, for the purpose of giving the initial movement to the automobile to extricate the same from a rut or mud hole.

When the device is not in use it may be compactly folded and stored away.

What I claim to be new is:

A device for pulling automobiles out of mudholes, comprising two parallel rods, slats each having transverse apertures for the reception of said ropes, means upon the ropes adjacent to the slats for holding the latter spaced apart, hooks fastened to the ends of the ropes, semi-circular rods having eyes at their ends adapted to receive said ropes near the ends thereof which are adapted to pass about the forward wheels of an automobile, said rods adapted to conform to and engage about the forward wheel of an automobile and the hooks adjacent to the end rod of the series adapted for engagement to the spoke of the forward wheel, and the hooks at the opposite end designed to be passed over the rim of the rear wheel to engage a spoke thereof from each side of the wheel.

In testimony whereof I hereunto affix my signature.

JOHN WILLIAM WALTER.